(12) United States Patent
Koizumi et al.

(10) Patent No.: US 8,430,132 B2
(45) Date of Patent: *Apr. 30, 2013

(54) AIR HOSE DELIVERY ASSEMBLIES

(75) Inventors: Scott Takayuki Koizumi, Fairfield, CA (US); Brian Michael Piety, Vacaville, CA (US); William Taylor O'Connor, Jacksonville, FL (US)

(73) Assignee: Hobart Brothers Company, Troy, OH (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/107,020

(22) Filed: May 13, 2011

(65) Prior Publication Data

US 2011/0209792 A1 Sep. 1, 2011

Related U.S. Application Data

(63) Continuation of application No. 11/700,977, filed on Feb. 1, 2007, now Pat. No. 7,946,311.

(51) Int. Cl.
*F16L 11/00* (2006.01)

(52) U.S. Cl.
USPC ........... 138/124; 138/123; 138/149; 138/137; 138/140

(58) Field of Classification Search .................. 138/123, 138/137, 140, 141, 133, 134, 149
See application file for complete search history.

(56) References Cited

U.S. PATENT DOCUMENTS

| | | | | |
|---|---|---|---|---|
| 3,047,026 A | * | 7/1962 | Kahn | 138/122 |
| 3,275,038 A | * | 9/1966 | Roberts et al. | 138/122 |
| 3,607,517 A | | 9/1971 | Pelley et al. | |
| 4,196,755 A | * | 4/1980 | Kutnyak et al. | 138/150 |
| 4,302,266 A | * | 11/1981 | Kutnyak | 156/149 |
| 4,478,661 A | * | 10/1984 | Lewis | 156/92 |
| 4,737,210 A | * | 4/1988 | Dougherty | 156/148 |
| 4,846,383 A | * | 7/1989 | Gallagher | 224/243 |
| 5,046,531 A | * | 9/1991 | Kanao | 138/122 |
| 5,204,403 A | * | 4/1993 | Furuta et al. | 524/493 |
| 5,385,174 A | * | 1/1995 | Kanao | 138/122 |
| 5,485,870 A | * | 1/1996 | Kraik | 138/122 |
| 6,286,876 B1 | * | 9/2001 | Jasperse et al. | 285/260 |
| 6,308,741 B1 | * | 10/2001 | Payne | 138/110 |
| 6,670,004 B1 | * | 12/2003 | Green | 428/35.7 |
| 6,983,767 B2 | * | 1/2006 | Rickards | 138/110 |
| 7,085,455 B2 | * | 8/2006 | Morris | 385/100 |
| 2002/0117852 A1 | * | 8/2002 | Jenum | 285/260 |
| 2004/0058603 A1 | * | 3/2004 | Hayes | 442/286 |
| 2004/0154676 A1 | | 8/2004 | Wilkinson | |
| 2005/0092384 A1 | * | 5/2005 | Curb et al. | 138/140 |
| 2006/0280889 A1 | * | 12/2006 | Powell et al. | 428/36.91 |
| 2010/0212768 A1 | * | 8/2010 | Resendes | 138/116 |

FOREIGN PATENT DOCUMENTS

GB 1416872 A 3/1969

* cited by examiner

*Primary Examiner* — Patrick F Brinson
(74) *Attorney, Agent, or Firm* — Fletcher Yoder P.C.

(57) ABSTRACT

A preconditioned air hose includes an abrasion-resistant external layer made of robust nylon, an insulating layer, and an inner layer. The robust external layer protects the air hose from wear and degradation due to abrasion. The external layer may be made of a fabric with an abrasion resistance of at least 22,000 cycles to failure as measured using the ASTM D 3884 standard. This external layer fabric may be composed of filaments having a linear density of about 1,000 denier. The external layer fabric may weigh about 10.8 ounces per square yard.

17 Claims, 4 Drawing Sheets

AIR HOSE DELIVERY ASSEMBLIES

CROSS REFERENCE TO RELATED APPLICATIONS

This application is a continuation of application Ser. No. 11/700,977, filed Feb. 1, 2007, entitled "ROBUST PRECONDITIONED AIR HOSE" in the name of Scott Takayuki Koizumi et al.

BACKGROUND

The invention relates generally to a hose assembly, and more particularly to a robust hose assembly for conducting preconditioned air from an air delivery system to a destination.

Most aircraft have multiple air conditioning systems which are used during different periods of operation. That is, an aircraft that is flying or taxiing on a runway must intake fresh air and condition the air onboard. On the other hand, an aircraft that is parked generally receives preconditioned air from an external source. These external sources can be mobile systems or systems built into a terminal, passenger boarding bridge, or hangar.

To supply preconditioned air to a parked aircraft from an external preconditioned air source, the aircraft must be connected to the preconditioned air source via a duct or hose. As can be expected, preconditioned air hoses can be rather large to accommodate the necessary airflow to control the environment in a large aircraft. For example, these hoses can have inner diameters on the order of 8 to 14 inches. In addition, because the aircraft cannot always be brought into close proximity with the preconditioned air source, some hoses must be quite long.

It can be appreciated that these hoses, due to their length and diameter, are often quite heavy. For example, a 14 inch diameter hose that is 60 feet long can weigh in excess of 60 pounds. Operators must move these hoses across the paved surfaces of the tarmac and runways to stretch the hoses from the preconditioned air sources to the aircraft. Dragging a long, heavy hose across paved surfaces can be quite difficult and inevitably leads to wear and degradation of the exterior of the hose. In some cases, the hoses are simply left on the tarmac to be run over by aircraft and other vehicles. This type of use contributes to the wear and degradation of the hose.

One solution to reduce wear on the hoses has been to include an abrasion-resistant scuff guard. While this scuff guard has reduced wear on the external fabric of the hoses, it increases the weight of the hoses considerably. A typical 60-foot hose with scuff guard can weigh around 84 pounds. In addition, the scuff guard does little to prevent wear from vehicle tires running over the hose.

Therefore, it would be advantageous to have a system that protects the exterior of the hoses from wear in various situations while also reducing the weight of the hoses.

BRIEF DESCRIPTION

According to one embodiment of the present invention, an air delivery hose assembly is provided, including an external layer made of a fabric having an abrasion resistance of at least 22,000 cycles to failure as measured using the ASTM D 3884 standard. This assembly may also include an inner layer, an insulating layer, and/or a structural support.

According to another embodiment of the present invention, a method of manufacturing an air delivery hose assembly is provided, including creating at least one panel of an external layer made of a fabric having an abrasion resistance of at least 22,000 cycles to failure as measured using the ASTM D 3884 standard, folding the panel or combining two of the panels such that inner surfaces of the panels are disposed in mutually facing orientation, and securing at least one edge of the folded panel or combined panels to form a tubular structure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
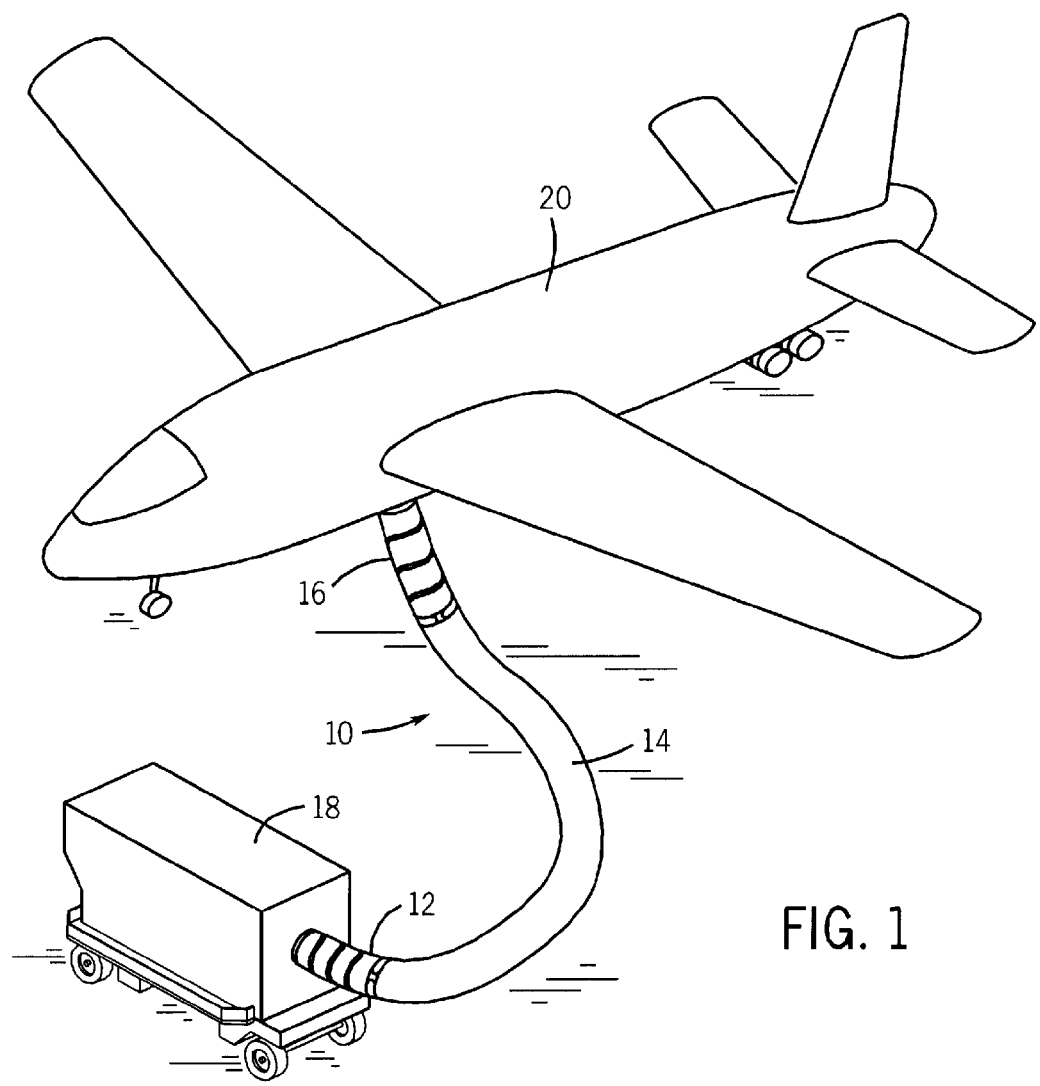
FIG. 1 is a perspective view of an aircraft connected to an air delivery system via a robust preconditioned air hose assembly, according to an embodiment of the present technique.

Referring generally to FIG. 1, a robust preconditioned air hose assembly is illustrated, generally designated by the reference numeral 10. While FIG. 1 illustrates hose assembly 10 in the context of an aircraft air hose, it should be appreciated by one skilled in the art that hose assembly 10 may be used in various other settings, such as in construction. The air hose assembly 10 may include a first reinforced section 12, a flat section 14, and a second reinforced section 16. It should be appreciated by one skilled in the art that the air hose assembly 10 may include any number and combination of reinforced sections and/or flat sections, depending on the design specifications for a desired assembly. The air hose assembly 10 may be configured to connect an air delivery system 18 to an aircraft 20. The air delivery system 18 may, for example, be a mobile ground power unit as illustrated in FIG. 1. Alternatively, the air delivery system 18 may include equipment that is attached to a passenger bridge or to a fixed location, such as the terminal building. The air hose assembly 10 delivers preconditioned air to the aircraft 20 to alleviate the need to use the air conditioning system of the aircraft itself while the aircraft 20 is parked. Aircraft 20, which may be a commercial, military or private aircraft, is illustrated as it may be parked on the ground, such as at a terminal or other facility. The ground is generally a tarmac, runway, or hangar floor, but could be any surface on which an aircraft is parked.

Air hose assembly 10 must be moved out of the way of aircraft 20 when aircraft 20 is in motion, such as when it taxies to and from a terminal. When aircraft 20 is parked, air hose assembly 10 is moved into proximity and connected to aircraft 20, thus connecting the air delivery system 18 and aircraft 20. Before aircraft 20 begins moving, air hose assembly 10 is detached from aircraft 20 and moved away so that it is not in the path of aircraft 20 or so that it can be used to couple air delivery system 18 to another aircraft. Alternatively, air hose assembly 10 may be detached from aircraft 20 and left on the ground such that aircraft or other vehicles may run over the flat section 14.

Figure 2:
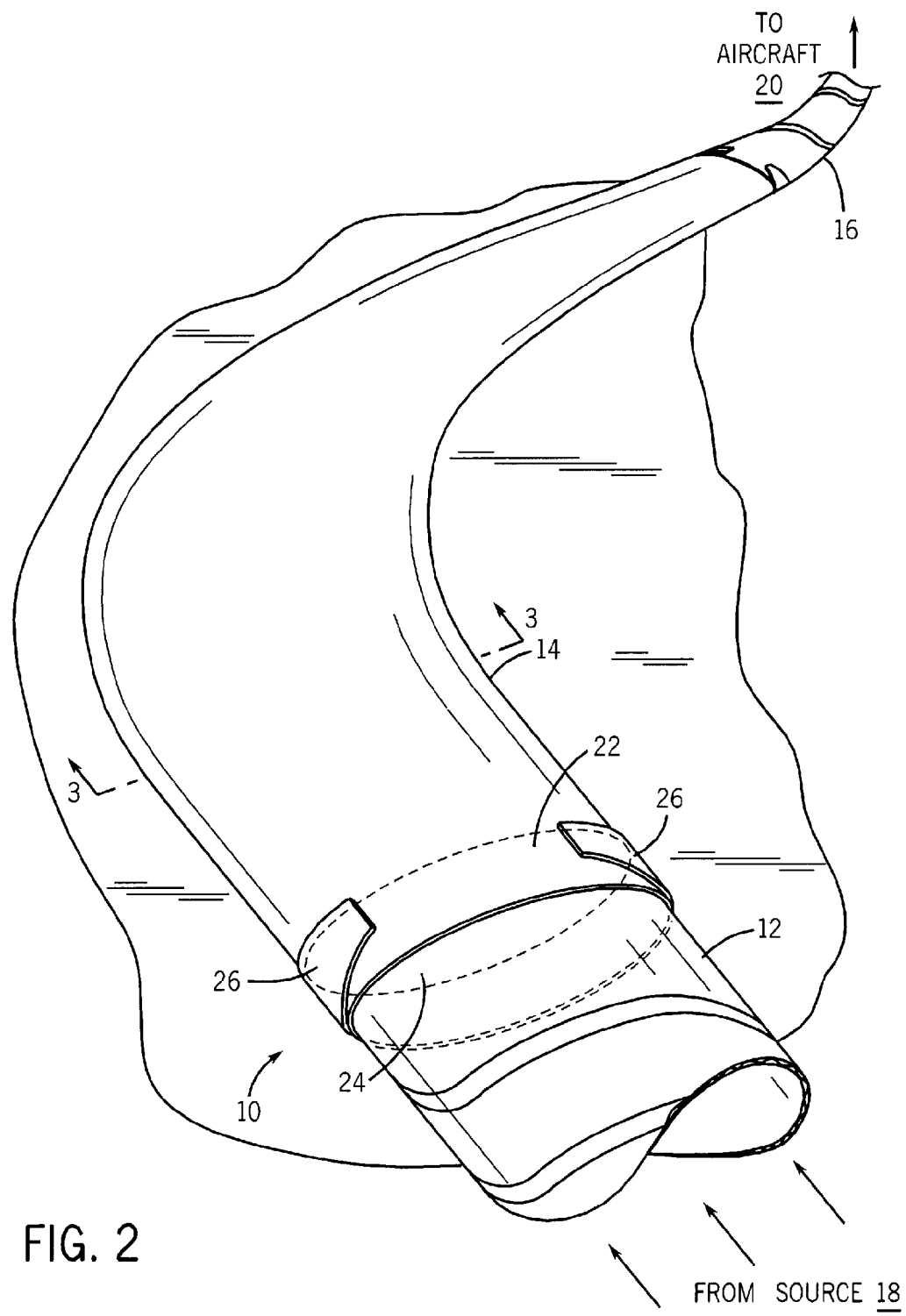
FIG. 2 is a perspective view of the robust preconditioned air hose assembly of the type shown in FIG. 1.

Turning now to FIG. 2, air hose assembly 10 is illustrated. The assembly includes a series of hose sections which may be secured to one another by similar and mating ends. In the illustration of FIG. 2, three such sections are shown, including the first reinforced section 12 (shown interrupted in the view of FIG. 2), the flat section 14, and the second reinforced section 16 extending from section 14 (also shown interrupted in the figure). Each section of hose assembly includes a female end, which may be termed a connection end 22, and a male end, which may be termed an insertion end 24. The connection end 22 is designed to open via integral bellows or wall portions that permit expansion of the connection end 22 to receive the insertion end 24. Tabs 26 on the connection end 22 permit the structure to be tightly closed, collapsing the bellows or wall sections. The insertion end 24 may be secured in place by hook-and-loop fastener material on both the interior of the connection end 26 and the exterior of the insertion end 24. After securing the insertion end 24 in place, the bellows provided on the connection end 22 may be collapsed by securing extensions or tabs on either side of the connection end 22 to an exterior surface of the connection end 22. It should be appreciated by one skilled in the art that the hose sections may include alternate end fasteners, such as a zipper, a simple hook-and-loop fastener, or a combination of closures. Alternatively, the hose sections may not include end fasteners.

Figure 3:
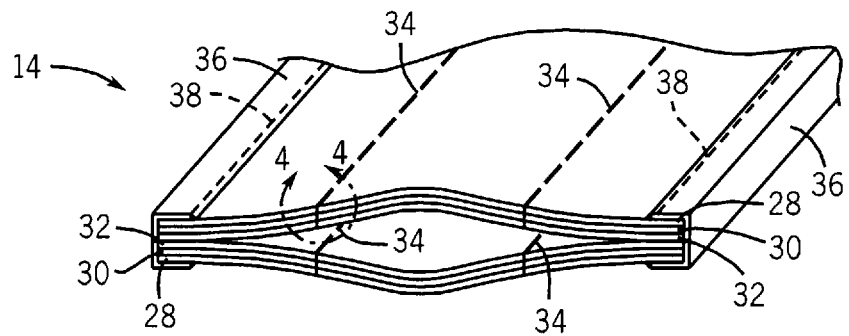
FIG. 3 is a cross-sectional view of the flat hose assembly of the type shown in FIG. 1, taken along line 3-3.
Figure 4:
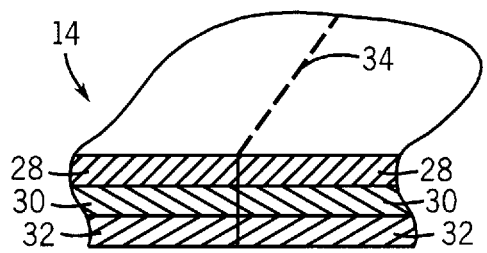
FIG. 4 is a detail view of the flat hose assembly cross section of FIG. 3, taken along line 4-4.

FIGS. 3 and 4 illustrate the layers that make up flat section 14 according to an embodiment of the present invention. Flat section 14 includes an external layer 28 which may be made of a robust nylon fabric such as nylon 6,6. Such materials are commercially available from various sources, such as from Invista™ of Wichita, Kans., under the commercial designation Cordura® brand nylon fabric, and also sometimes referred to in commerce as "Vent Fab". In one embodiment of the present invention, external layer 28 has an abrasion resistance of at least 22,000 cycles to failure as measured by the Taber abrasion test. The Taber abrasion test uses the ASTM D 3884 "Standard Guide for Abrasion Resistance of Textile Fabrics (Rotary Platform, Double-Head Method)" available from ASTM International of West Conshohocken, Pa. "Cycles to failure" is a measurement of the number of cycles the fabric can endure on a double-head rotary abrasion platform before any size hole is observed in the fabric.

External layer 28 may weigh in the range from about 2 to about 17 ounces per square yard and be made of filaments having a linear density from about 800 to about 1,200 denier. Preferably, external layer 28 weighs about 10.8 ounces per square yard with filaments of about 1,000 denier. In addition, external layer 28 may include a waterproof coating such as polyurethane configured so that moisture may pass through external layer 28 in only one direction. In one embodiment of the present invention, external layer 28 may be colored Pantone orange 021 C. That is, the CMYK standard format color may be 0,40,100,0, and the RGB standard format color may be 255,153,0. In another embodiment of the present invention, external layer 28 may be camouflaged for use in military operations.

Flat section 14 may further include an insulating layer 30. This insulating layer 30 may be a radiant barrier such as R+ Heatshield White available commercially from Innovative Energy, Inc. of Lowell, Ind. Insulating layer 30 may be composed of aluminum on one side and polyethylene on the other side. Preferentially, the insulating layer 30 has a reflectivity of about 0.97 as obtained by a measurement method based on ASTM C 1371, which measures emittance of materials near room temperature using portable emissometers. Flat section 14 may also include an inner layer 32 which is configured to protect the insulating layer 30 from airflow through the section 14. In one embodiment of the present invention, inner layer 32 may be made of polyester. In an alternative embodiment of the present invention, flat section 14 may include only external layer 28 or may include external layer 28 and internal layer 32.

Referring again to FIG. 3, external layer 28, insulating layer 30, and inner layer 32 may be assembled to form flat section 14. This assembly includes obtaining sections of each layer in the proper length and width for a desired section 14, stacking the three layers in the proper order, and sewing at least one seam 34 down the length of the stack. The layers may be stacked such that the inner layer 32 is laid down first, the insulating layer 30 is laid down on top of inner layer 32 with the aluminum side up, and the exterior layer 28 is laid on top of insulating layer 30 such that moisture is allowed to travel upward through the waterproof coating of external layer 32. Two such stacks may then be placed together such that the inner layers 32 face each other. A webbing 36 may then be placed along the lengthwise edges of the stacks such that the webbing 36 covers part of the external layers 28 on both the top and bottom of the assembly. A seam 38 may then be sewn down the length of each webbing 36 such that the webbing 36 and the two stacks of layers are joined together.

Figure 5:
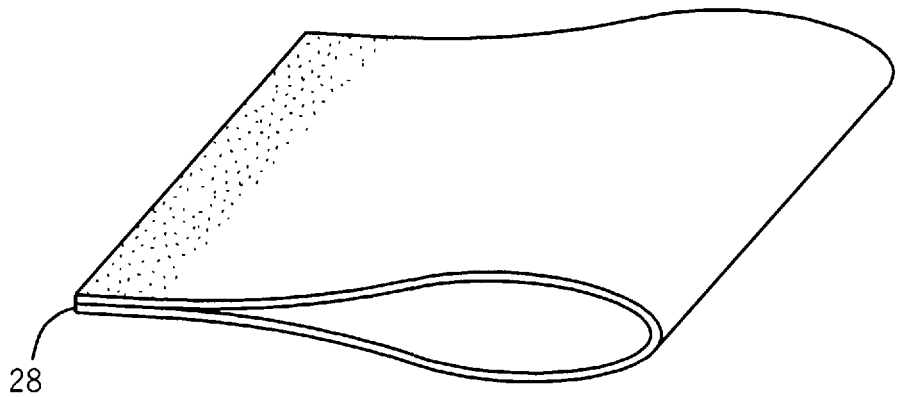
FIG. 5 is a cross-sectional view of an alternative embodiment of the flat hose assembly.

FIG. 5 illustrates an alternative to flat section 14. A flat hose assembly may include only external layer 28. External layer 28 may be sewn as described above in reference to FIG. 3, or may be formed into a hose using a heat welding process, wherein the open sides are secured to one another by a very high-temperature press.

Figure 6:
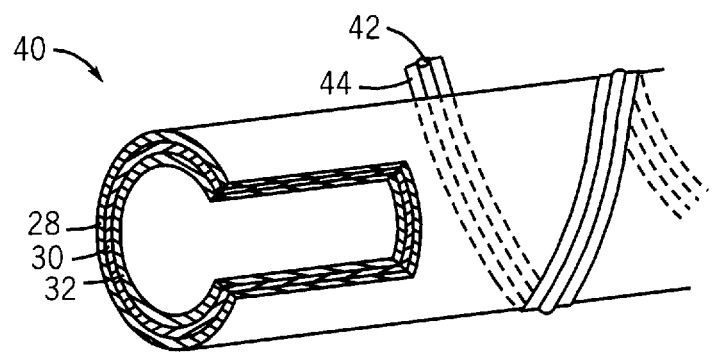
FIG. 6 is a perspective view of the reinforced hose assembly of the type shown in FIG. 1.
Figure 7:
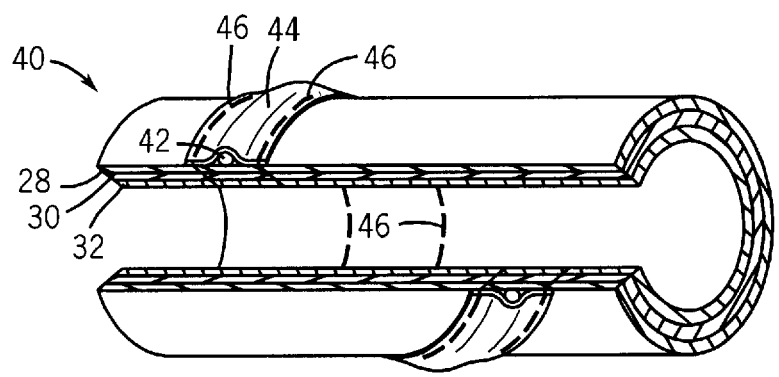
FIG. 7 is a cross-sectional view of the reinforced hose assembly of the type shown in FIG. 6.

As can be seen in FIGS. 6 and 7, an alternate embodiment of the present invention may include wire reinforcement. A reinforced hose assembly 40 may include external layer 28, insulating layer 30, and inner layer 32. Alternatively, reinforced hose assembly 40 may include only external layer 28 or may include external layer 28 and internal layer 32. In addition, a structural reinforcing element 42 may span the length of the hose assembly 40. Structural reinforcing element 42 may include, for example, a wire coil. While FIGS. 6 and 7 show structural reinforcing element 42 wrapped around the exterior of hose assembly 40, it should be appreciated by one skilled in the art that structural reinforcing element 42 may instead be situated between layers of the hose assembly 40, as illustrated in FIG. 8, or in the interior of hose assembly 40.

In the embodiment illustrated in FIGS. 6 and 7, structural reinforcing element 42 is secured to the hose assembly via a scuff guard 44. Scuff guard 44 may be designed to protect structural reinforcing element 42 from abrasion. Preferentially, scuff guard 44 is composed of rubber or the robust nylon fabric as in external layer 28. In one embodiment of the present invention, external layer 28, insulating layer 30, and inner layer 32 are assembled to form a cylindrical hose assembly. Structural reinforcing element 42 may then be placed around the cylindrical hose assembly, and scuff guard 44 may be secured to the cylindrical hose assembly over structural reinforcing element 42 via seams 46.

Figure 8:
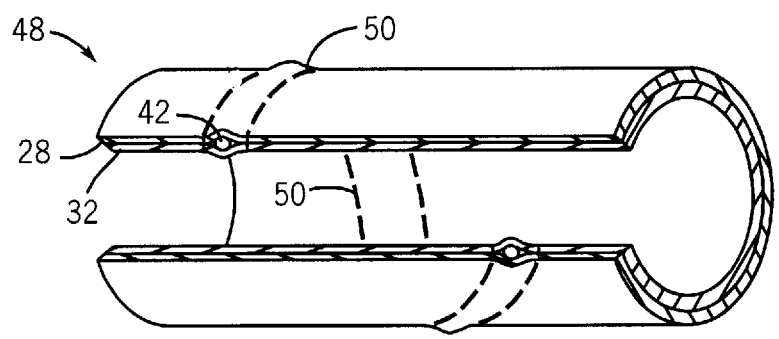
FIG. 8 is a cross-sectional view of an alternative embodiment of the reinforced hose assembly.

Alternatively, the structural reinforcing element 42 may be secured inside the hose assembly, as illustrated in FIG. 8. In this embodiment of the present invention, a hose assembly 48 includes external layer 28 and internal layer 32. Structural reinforcing element 42 may be disposed between the layers

28 and 32. The entire assembly may be secured via seams 50 which hold the structural reinforcing element 42 in place and hold the layers 28 and 32 together.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A cylindrical hose assembly, comprising:
   an external layer disposed on an outside of the cylindrical hose assembly and comprising a fabric made of a nylon material having a weight not exceeding approximately 11 ounces per square yard;
   an inner layer disposed on an inside of the cylindrical hose assembly; and
   an insulating layer disposed between the external layer and the inner layer and comprising a thermoplastic polymer; and
   wherein the cylindrical hose assembly is suitable for conveying pressurized air to an aircraft.

2. The air hose delivery assembly of claim 1, wherein the nylon material of the external layer has a weight of approximately 10.8 ounces per square yard.

3. The air hose assembly of claim 1, wherein the nylon material is nylon 6,6.

4. The air hose assembly of claim 1, wherein the insulating layer comprises a first side made of the thermoplastic polymer and a second side made of aluminum.

5. The air hose assembly of claim 1, wherein a waterproof coating is disposed on the external layer.

6. The air hose assembly of claim 1, wherein the nylon material of the external layer comprises a Cordura® brand nylon fabric.

7. An air hose delivery assembly, comprising:
   an external layer comprising:
      a first panel comprising a fabric made of a nylon material having a weight not exceeding approximately 11 ounces per square yard;
      a second panel combined with the first panel such that inner surfaces of the first panel and the second panel are disposed in mutually facing orientation, wherein at least one edge of the combined panels is secured to form a tubular structure; and
   a structural reinforcement element, wherein an abrasion-resistant scuff guard is disposed about the structural reinforcement element.

8. The air hose delivery assembly of claim 7, comprising an inner layer disposed within the tubular structure.

9. The air hose delivery assembly of claim 8, comprising an insulating layer disposed between an inner surface of the external layer and an outer surface of the inner layer.

10. The air hose delivery assembly of claim 7, wherein the at least one edge of the combined panels is secured via sewing.

11. The air hose delivery assembly of claim 7, wherein the at least one secured edge comprises a webbing.

12. The air hose delivery assembly of claim 7, wherein the at least one edge of the combined panels is secured via a heat welding process.

13. The air hose delivery assembly of claim 7, wherein the structural reinforcement element comprises a coil of wire.

14. An air hose delivery assembly, comprising:
   a first panel comprising a first edge and a second edge secured to one another to form a tubular structure, wherein the first panel comprises a fabric made of a nylon material having a weight not exceeding approximately 11 ounces per square yard;
   an inner layer disposed on an inside of the tubular structure;
   an insulating layer disposed between a wall of the tubular structure and the inner layer; and
   wherein the air hose delivery assembly is suitable for conveying pressurized air to an aircraft.

15. The air hose delivery assembly of claim 14, wherein the nylon material is nylon 6,6.

16. The air hose delivery assembly of claim 14, wherein the nylon material has a weight of approximately 10.8 ounces per square yard.

17. The air hose delivery assembly of claim 14, comprising a webbing disposed about the secured first edge and second edge.

* * * * *